United States Patent

[11] 3,549,177

| | | |
|---|---|---|
| [72] | Inventor | Tomas Julio Sotolongo<br>Long Branch, N.J. |
| [21] | Appl. No. | 779,670 |
| [22] | Filed | Nov. 29, 1968 |
| [45] | Patented | Dec. 22, 1970 |
| [73] | Assignee | Thomas & Betts Corporation<br>Union, N.J.<br>a corporation of New Jersey |

[54] FLEXIBLE CONDUIT FITTING
7 Claims, 4 Drawing Figs.

[52] U.S. Cl. .................................................. 285/175,
285/247, 285/161
[51] Int. Cl. ...................................... F16l 33/24,
F16l 47/00
[50] Field of Search........................................... 285/247,
161, 248, 245, 334.5, 175, 174, 250 (Cursory),
251, 246

[56]  References Cited
UNITED STATES PATENTS

| 1,006,671 | 10/1911 | Myer.............................. | 285/247 |
| 2,554,456 | 5/1951 | Coleman et al................ | 285/161 |
| 2,782,059 | 2/1957 | Stranberg...................... | 285/247 |
| 3,104,120 | 9/1963 | Myers............................. | 285/161 |
| 3,408,099 | 10/1968 | Appleton....................... | 285/247 |

FOREIGN PATENTS

| 562,716 | 7/1944 | Great Britain................. | 285/248 |
| 690,042 | 4/1953 | Great Britain................. | 285/245 |

Primary Examiner—Thomas F. Callaghan
Attorney—David Teschner

ABSTRACT: The disclosure is directed to a fitting for coupling a flexible nonmetallic raceway to an electrical enclosure. The fitting is constructed in two parts; the first being a body portion and the second being a gland. The first end of the body portion has an externally threaded region to permit attachment to the wall of an electrical enclosure and a sealing ring to provide a moisture seal between the fitting and the electrical enclosure. Intermediate the second externally threaded body portion is a region for receipt thereon of the internally threaded portion of the gland for assembly. Extending therefrom is a shoulder and thence a tapered portion and finally an externally threaded third portion extending almost to the end of the body portion. The internal passage of the gland is generally cylindrical terminating in a tapered portion which extends from the cylindrical portion to the portion having the internal thread for assembly with the body portion. The external surface of the gland is tapered to a plurality of faces upon which a wrench, or other tools, may be applied in order to facilitate the assembly of the gland to the body portion. The tapered portion of the body and the gland are complementary so that a raceway placed atop the third internally threaded portion of the body will be forced to the tapered portion and trapped between the tapered portion of the body and the gland when the body and gland are assembled. The third externally tapered portion is provided with a left-handed modified buttress thread, to permit the body to be screwed into the raceway and to form an additional holding coupling between the body portion and the raceway.

PATENTED DEC22 1970  3,549,177

INVENTOR:
TOMAS J. SOTOLONGO
BY
ATTORNEY

FLEXIBLE CONDUIT FITTING

BACKGROUND OF THE INVENTION

1. Field of the Invention

The invention finds utility in the coupling of flexible nonmetallic raceway such as plastic or elastrometric materials to electrical enclosures.

2. Description of the Prior Art

Prior art devices for coupling flexible nonmetallic raceway to enclosures consisted generally of three portions; a body portion, a gland, and a ferrule. The gland was applied over the outside jacket of the raceway as was the ferrule and then the raceway was placed upon the body portion which also acted as an anvil for the ferrule. Assembly of the gland to the body portion distorted the ferrule as well as the raceway, causing seizing of the raceway to the fitting. In such assemblies it was not possible to remove the assembly once it was made and generally required the entire fitting to be severed from the raceway in order to permit the raceway to be used again. In some devices it was possible to disassemble the fitting in that the gland could be removed from the body portion, however, it was not possible to remove the ferrule from the raceway due to the distortion of the ferrule and the raceway as a result of the assembly. In these instances the end of the raceway again would have to be severed from the remaining portion thereof and a new ferrule provided to reassemble the raceway to the fitting.

SUMMARY OF THE INVENTION

The present invention overcomes the difficulties noted above with respect to prior art devices by providing a fitting for coupling flexible nonmetallic raceways to electrical enclosures which can be readily installed and removed and which neither destroys nor distorts the raceway nor in any way affects the operation of the fitting permitting both the fitting and the raceway to be reused. The fitting is formed from two portions; a gland and a body portion. The body portion has at one end an externally threaded portion for placement within the knockout of an electrical box enclosure and which can have applied thereto a nut or other fastening device for fastening the body portion to the electrical enclosure. A flange, having a plurality of wrench flats, is provided to permit the tightening of the fitting to the electrical enclosure wall. Intermediate the threaded portion and the flange there is found a shoulder having therein a recess for the receipt of an O-sealing ring. The shoulder acts both to retain the sealing ring and also to prevent overdistortion of the ring during the sealing operation by providing a limit for the tightening of the fitting to the electrical enclosure. Adjacent the flange, and extending toward the front end of the fitting, that end receiving the raceway thereon, is a further externally threaded portion to receive thereon the internally threaded portion of the gland for assembly of the two portions. Finally, there is found the third externally threaded portion having a modified buttress thread for digging into the internal surface of the raceway and for establishing a firm contact between the fitting body and the raceway. Extending between the third and second externally threaded portions is a tapered portion terminating in a shoulder. The shoulder acts as a stop for the insertion of the fitting within the raceway and the tapered portion causes the expansion of the end of the raceway to follow its contour. A complementary tapered portion exists in the internal surface of the gland intermediate the cylindrical portion and the internally threaded portion to cause trapping and holding of the expanded end portion of the raceway on assembly. In addition, there are provided flat areas prior to the taper and prior to the beginning of the third or buttress thread which contact the internal surface of the raceway in order to provide a moisture seal upon assembly of the gland to the body. The gland is similarly provided with a series of wrench flats and is generally of tapered configuration from the wrench flats to its end adjacent the raceway. It is therefore an object of this invention to provide an improved fitting for coupling a flexible nonmetallic raceway to an electrical enclosure.

It is another object of this invention to provide an improved fitting whereby the raceway is held jointly by the action of a modified buttress threaded portion of the body being embedded within the inner surface of the raceway and by the trapping of the end portion of the raceway between tapered portions of the fitting body and gland.

It is still another object of this invention to provide a fitting for coupling a flexible nonmetallic raceway to an electrical enclosure wherein the majority of the holding power is provided between the modified buttress thread, the tapered portions of the body of the fitting and the gland assembled therewith.

It is yet another object of this invention to provide an improved fitting for coupling a flexible nonmetallic raceway to an electrical enclosure wherein there is provided liquid moisture seals between the fitting and raceway and between the fitting and the electrical enclosure.

Other objects and features of the invention will be pointed out in the following description and claims and illustrated in the accompanying drawings, which disclose, by way of example, the principles of the invention and the best mode which has been contemplated for carrying it out.

BRIEF DESCRIPTION OF THE DRAWING

In the Drawings.

Similar elements will be given similar reference characters in each of the respective figures.

DESCRIPTION OF THE PREFERRED EMBODIMENTS

Figure 1:
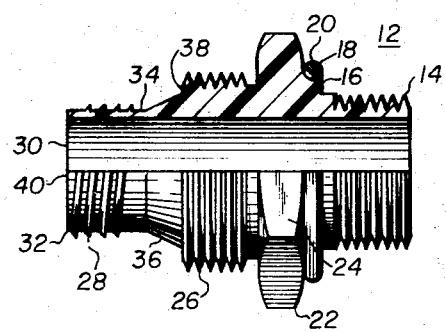
FIG. 1 is a side elevation of the body portion of a connector constructed in accordance with the concepts of the invention and is shown partially in section.
Figure 2:
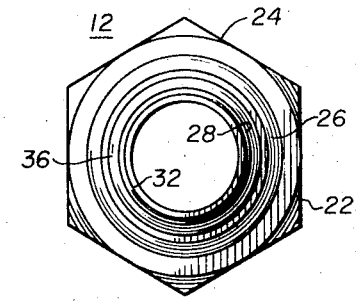
FIG. 2 is a front elevation of the body portion of FIG. 1.

Turning now to FIGS. 1 and 2 there is shown the body portion 12 of a fitting constructed in accordance with the concepts of the invention. Body portion 12 has at a first end thereof an externally threaded portion 14 for insertion within the knockout of an electrical enclosure (not shown) and which will receive thereon a locknut (not shown) to fasten the body portion 12 to the electrical enclosure. A shoulder 16 provided adjacent the threaded portion 14 has therein a recess 18 into which is positioned a sealing O-ring 20. Shoulder 18 will act as a stop to prevent overtightening and thus overdistortion of the sealing O-ring 20. Overdistortion will prevent the O-ring 20 from being effective as a moisture seal. Adjacent the shoulder 18 is a flange 22 having a plurality of wrench flats 24 thereon. A wrench, or similar tool, can be applied to the wrench flats 24 to tighten the body portion 12 to the wall of an electrical enclosure or be used in conjunction with similar wrench flats on the gland as will be discussed below for assembling body portion 12 to the gland portion. Adjacent the flange 22 is a second externally threaded portion 26 for receipt thereon of the internally threaded portion of the gland for assembling the body portion 12 to the gland as will be described below. Adjacent the second end of the body portion 12 is a third externally threaded portion 28. The threads 28 are a left-handed modified buttress thread terminating short of the end 30 of the body portion 12 to provide a small flat region 32. Region 32 will permit a moisture seal to be created between the internal surface of the raceway and the body portion 12 as the same is assembled to the body portion 12 by use of the gland. A similar flat portion 34 exists at the side of the buttress thread 28 remote from the end 30. Tapered portion 36 extends from the flat portion 34 to a shoulder 38. The shoulder 38 will act as a stop for the insertion of a raceway over the threaded portion 28. Additionally, the tapered portion 36 will cause the end of the raceway to be expanded as it transverses the tapered portion 36. The body portion 12 can be inserted into the raceway by screwing the buttress thread 28 into the inner surface of the raceway forming a thread therein as it advances or it may be forced into it and a thread created when the body portion 12 and gland are assembled. As can be seen from FIG. 1, a longitudinal passage 40 extends through the entire body portion 12.

Figure 3:
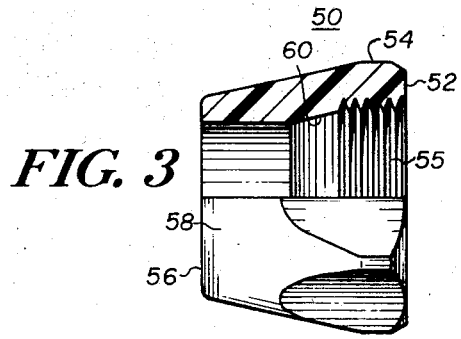
FIG. 3 is a side elevation, partially in section, of the gland employed with the body portion of FIGS. 1 and 2.

Turning now to FIG. 3 there is shown a gland 50 to be assembled with the body portion 12 of FIG. 1. The gland 50 has at a first end 52 thereof a series of wrench flats 54, on the external surface, which can be used in conjunction with the wrench flats 24 of the flange 22 to assemble the body portion 12 with the gland 50. Adjacent the end 52, on the inside surface of the gland is an internally threaded portion 55 adjacent the end 56, the longitudinal passage 58 is generally cylindrical and terminates in a tapered portion 60 intermediate the cylindrical portion and the internally threaded portion 54. The outside surface of the gland 50 extending from the wrench flats 54 towards the end 56 is tapered in a generally conical manner.

Figure 4:
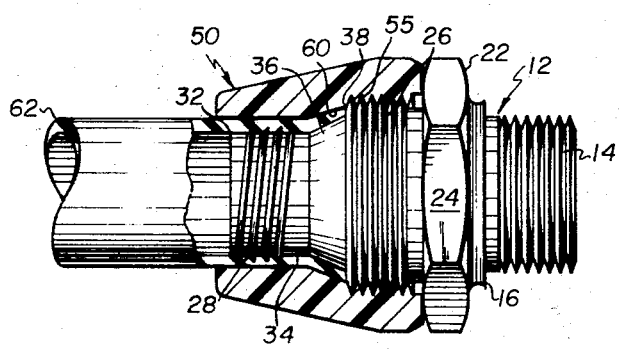
FIG. 4 is a side elevation, partially in section, of the assembled body portion of FIGS. 1 and 2 and gland of FIG. 3 and showing a raceway installed therein.

Turning now to FIG. 4 there is shown the assembly of the body portion 12 with the gland 50 as assembled about a raceway 62. The raceway 62 has been square cut across its end so that the cut edge is perpendicular to the sidewalls of the raceway. The body portion 12 is screwed into the raceway 62 so that the buttress thread 28 engages the inner surface of the raceway and the advancing of the body portion 12 continues until the raceway spreads and advances over tapered portion 36 and comes to rest against the shoulder 38. The gland 50, which had already been positioned on the outer jacket of the raceway 62, will now be slid over to the raceway so that its threaded portion 55 will be made to engage the externally threaded portion 26 of the body portion 12. As the gland 50 is now tightened upon the body portion 12 the flared ends of the raceway 62 will be trapped and held between the tapered portion 36 of the body portion 12 and the tapered portion 60 of the gland 50 providing a fluid seal as well as providing holding power for the raceway. Cylindrical portion of the gland 50 will force compression of the raceway 62 into the externally threaded portion 28 and will also cause contact between the raceway inner surface and the flat portions 32 and 34 adjacent the buttress thread 28 providing good moisture seals at these portions. The holding power of the fitting to the raceway 62 results from the contact of the buttress threads 28 with the raceway 62 and the trapping and holding of the raceway between tapered surfaces 36 of body portion 12 and 60 of gland 50. However, major holding power, in the event that the raceway is somewhat oversized, would occur from the tapered portion 36 of the body portion 12 and the complementary tapered portion 60 of the gland 50. The entire assembly is now ready for assembly with the wall of an electrical enclosure (not shown). The sealing O-ring 20 (shown in FIG. 1) now may be inserted into the recess 18 of the shoulder 16 and the threaded section 14 of the body portion 12 inserted within the knockout of an electrical enclosure. A fastening device (not shown) will then be threaded upon the threaded portion 14 and tightened to hold the body portion 12 to the wall of the electrical enclosure. Shoulder 16 prevents overtightening, and therefore unwanted distortion of the O-ring 20, which would prevent its functioning for proper moisture sealing.

The threaded portions 14 and 26 are right-handed whereas the buttress thread portion 28 is intentionally made left-handed. Thus after the body portion 12 has been threaded within the raceway 62, or positioned therein, the application of the gland 50 to the body portion 12 will turn the body portion 12 in such a direction as to increase its capture of the raceway 62. During disassembly, the turning of the gland 50 with respect to the body portion 12 will result in the turning of the body portion 12 as well and cause the body portion 12 to be advanced from contact with the raceway 62, thus assisting in the disassembly of both the gland 30 and the raceway 62.

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

I claim:

1. A fitting for coupling a raceway to an electrical enclosure comprising a body portion having a longitudinal passage therethrough; a first externally threaded portion at one end thereof for insertion within the knockout of an electrical enclosure and for receipt thereon of a fastening means; a second externally threaded portion intermediate said body portion for receipt thereon of the internally threaded portion of a gland; a flange having a plurality of faces intermediate said first and second externally threaded portions; a third substantially cylindrical portion, adjacent the second end of said body portion; a left-handed buttress thread circumjacent said third substantially cylindrical portion, for engagement with, and for embedding into, the inner surface of a raceway; a tapered portion extending from said third externally threaded portion to said second externally threaded portion, for placing thereon the expanded end of said raceway; a gland having a plurality of faces at a first end thereof and a longitudinal passage therethrough; as internal thread in said passage adjacent the end of said gland having said faces thereon, a complementary tapered portion of said longitudinal passage adjacent said tapered portion of said body portion when said gland and said body portion are assembled and a cylindrical portion adjacent said complementary tapered portion whereby a raceway placed upon said third externally threaded portion and said tapered portion is trapped and held between said tapered portion of said body portion and said complementary tapered portion of said longitudinal passage of said gland and between said cylindrical portion of the gland and the third externally threaded portion; said second externally threaded portion has a right-hand thread whereby the installation of said gland to said body portion causes said third externally threaded portion to be further inserted within said raceway and the disassembly of said gland from said body portion tends to remove said third externally threaded portion from said raceway.

2. A fitting, as defined in claim 1, further comprising a first nonthreaded portion extending from said second end of said body portion to the start of said third externally threaded portion, said raceway being clamped against said first nonthreaded portion when said gland is assembled with said body portion whereby a first moisture seal is provided between said raceway and said fitting at said second end.

3. A fitting, as defined in claim 2, further comprising a second nonthreaded portion extending from said third externally threaded portion to said tapered portion, said raceway being clamped against said second nonthreaded portion when said gland is assembled with said body portion whereby a second moisture seal is provided between said raceway and said fitting prior to said tapered portion.

4. A fitting, as defined in claim 1, further comprising a shoulder intermediate said tapered portion and said second externally threaded portion; said shoulder providing a stop to limit the insertion of said body portion into said raceway.

5. A fitting, as defined in claim 1, wherein the outside surface of said gland is tapered from a second end thereof towards said faces at said first end thereof.

6. A fitting, as defined in claim 1, further comprising a recess intermediate said first externally threaded portion of said body portion and said flange thereon for receipt in said recess of a sealing ring.

7. A fitting, as defined in claim 1, further comprising a shoulder intermediate said first externally threaded portion of said body portion and said flange thereon; a recess in said shoulder for receipt therein of a sealing ring; said shoulder limiting the distortion of said sealing ring when said fitting is assembled to an electrical enclosure.